United States Patent [19]

Butler

[11] 4,326,275
[45] Apr. 20, 1982

[54] DIRECTIONAL TRANSDUCER

[75] Inventor: John L. Butler, Marshfield, Mass.

[73] Assignee: Hazeltine Corporation, Greenlawn, N.Y.

[21] Appl. No.: 79,768

[22] Filed: Sep. 27, 1979

[51] Int. Cl.³ ............................................. H04B 17/00
[52] U.S. Cl. ................................... 367/160; 367/165; 367/166; 367/173; 310/329
[58] Field of Search ............... 367/158, 160, 161, 163, 367/165, 166, 171, 173, 174; 310/329

[56] References Cited

U.S. PATENT DOCUMENTS

| | | | |
|---|---|---|---|
| 2,650,991 | 9/1953 | Ketchledge | 367/166 |
| 2,913,602 | 11/1959 | Joy | 367/166 |
| 3,283,590 | 11/1966 | Shang | 310/329 |
| 3,328,752 | 6/1967 | Sims | 367/166 X |
| 3,739,327 | 6/1973 | Massa | 367/158 |
| 3,891,871 | 6/1975 | Henriquez | 367/166 |
| 3,893,342 | 7/1975 | Florian et al. | 310/329 |
| 4,015,233 | 3/1977 | Laurent et al. | 367/165 |

Primary Examiner—Harold J. Tudor
Attorney, Agent, or Firm—E. A. Onders; F. R Agovino

[57] ABSTRACT

A directional transducer is disclosed which includes flexural disc transducer elements mounted by their periphery to an inertial mass and connected to the transducer housing by their centers.

10 Claims, 2 Drawing Figures

DIRECTIONAL TRANSDUCER

BACKGROUND OF THE INVENTION

This invention relates to directional transducers and particularly to transducers wherein there are provided first and second flexural disc transducer elements, one mounted at each axial end of a cylindrical housing, wherein the transducer elements are electrically connected together to reinforce electrical signals resulting from acoustical signals incident on the transducer from the axial direction and to suppress electrical signals which result from acoustical signals incident on the transducer from directions which are perpendicular to the axis of the cylindrical housing.

In accordance with the prior art, transducers of this type have flexural disc transducer elements mounted directly to the housing at each end. The centers of the flexural discs are mechanically connected to an inertial mass suspended within the housing, so that upon being struck by an acoustical wave incident from the axial direction, the housing vibrates with respect to the inertial mass causing flexing of the discs transducer and a resulting electrical output signal.

It is an object of the present invention to provide a new and improved directional transducer of the aforementioned type which is more rugged and shock resistant in construction and which may be more easily assembled.

It is a further object of the invention to provide such a directional transducer wherein the flexural disc transducer elements may be prestressed by a selected amount following assembly of the transducer.

SUMMARY OF THE INVENTION

In accordance with the invention, there is provided a transducer which includes a housing having an axis and an inertial mass within the housing. First and second flexural transducer elements are provided, each comprising a planar member having a periphery. The planar members are mounted by their peripheries on axially opposite ends of the inertial mass substantially perpendicular to the axis. Force transmitting means are provided interconnecting central portions of each of the planar members with the housing along the axis. Finally, there are provided means for connecting the transducer elements to electrical signal detecting means.

In a preferred embodiment of the invention, the transducer has a cylindrical housing with a cylindrical interior space. An inertial mass having a cylindrical overall shape is within the housing and is slightly smaller than the interior of the housing. The inertial mass is provided with circular cavities formed in each axial end which are closed by disc transducer elements mounted to the axial ends of the inertial mass by their outer edges. The disc transducer elements are a bilaminar assembly of metallic spring material and piezoelectric material. The axially inner surface of each of the flexural discs within the cavity comprises a disc of piezoelectric material. The axially outer surfaces of the flexural disc transducer elements are connected by force transmitting rods to the adjacent axial ends of the cylindrical housing. Conductive members are provided interconnecting the transducer elements in series opposing relationship and connecting the elements to an electrical signal detecting apparatus. A high viscosity fluid may be provided within the housing, and there may also be provided means for dampening the vibration of the flexural discs, thereby to improve the broadband response of the transducer. In a preferred embodiment, the force transmitting rods are arranged to stress the flexural discs in an axial outward direction thereby to put compression forces on the piezoelectric elements, as well as provide external electrical connections.

For a better understanding of the present invention, together with other and further objects, reference is made to the following description, taken in conjunction with the accompanying drawings, and its scope will be pointed out in the appended claims.

DESCRIPTION OF THE INVENTION

Figure 1:
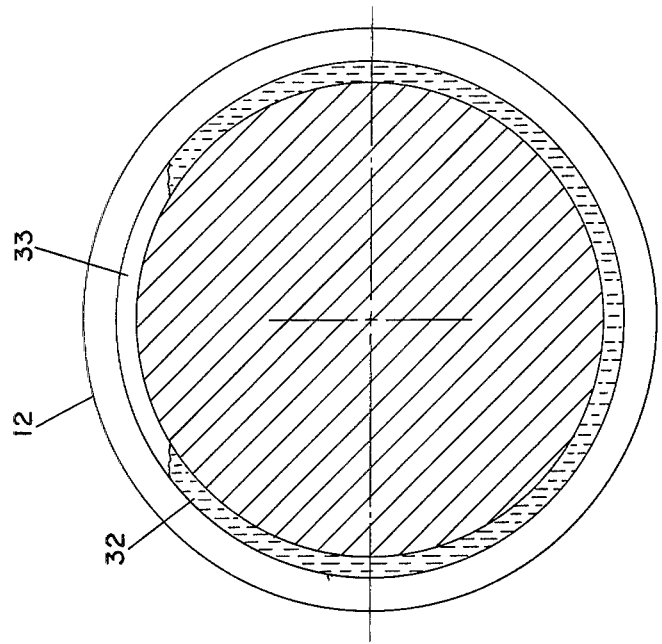
FIG. 1 is an axial end view of a directional transducer in accordance with the present invention.
Figure 2:
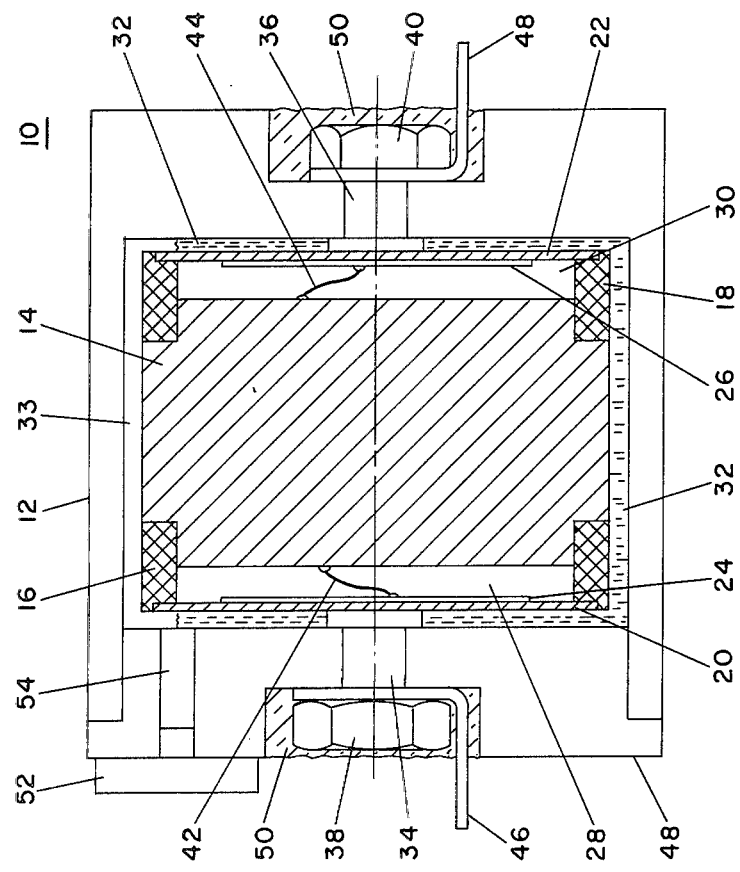
FIG. 2 is a cross sectional view of the FIG. 1 transducer.

Referring generally to FIGS. 1 and 2, there is shown a directional transducer 10 in accordance with the present invention. Transducer 10 includes an outer housing 12, which is generally made of plastic material, such as polycarbonate plastic which is available under the trade name LEXAN. Within plastic housing 12, there is provided an inertial mass 14 which is slightly smaller than the size of the internal cavity within housing 12. Housing 12 and inertial mass 14 have a generally cylindrical shape and an axis of symmetry 15. Inertial mass 14 is typically made of material which has a relatively high mass with respect to housing 12, and is preferably made from sintered tungsten, lead, or brass. Mass 14 is centrally located within housing 12 and connected to housing 12 as will be further described.

At each axial end of inertial mass 14, there is provided a cylindrical plastic ring 16, 18. Each ring is covered by a flexural disc 20, 22 preferably made of brass approximately 0.010 inches thick and the entire assembly 16, 18, 20, 22 attached to the inertial mass 14.

It should be noted that because flexural discs 20, 22 are mounted over their respective rings 16 and 18, they are supported at their periphery by inertial mass 14 and connected by their respective centers to housing 12. Thus, contrary to the usual arrangement for a transducer of this type, the flexural disc transducer elements are supported by the inertial mass at their periphery, and the housing at their center, rather than being mounted at their periphery to the housing and connected to the inertial mass at the center. This particular arrangement enables a more convenient assembly of the transducer, as will be described, and also enables prestressing of the transducer elements as also will be described.

Each flexural disc 20, 22 is provided with a disc transducer element 24, 26 mounted on its axially inner surface. The transducer elements 24, 26 are made of piezoelectric ceramic and are provided with conductive coatings on their axial inner and outer surfaces. These discs therefore act as the transducers and convert the mechanical stresses induced by vibration of the flexural discs 20, 22 into electrical signals.

The ceramic discs 24, 26 are mounted to the brass flexural discs 20, 22 using a conductive epoxy on the adjoining surfaces. Discs 24, 26 have approximately the same thickness as the brass flexural discs, but are slightly smaller in diameter so that they fit within the hollow cavities 28, 30 formed by closing of rings 16 and 18 by flexural discs 20 and 22. While cavities 28 and 30 contain only air, the space 32 between inertial mass 14 and housing 12 is preferably filled with a high viscosity fluid, for example a fluid having a viscosity of 3000 centistokes, via the fill hole 54 which is then sealed with plug 52. The high viscosity fluid tends to dampen vibration of the mass 14 with respect to the housing 12. The spacing between each of the flexural discs 20, 22 and the adjoining inner surface of housing 12 can be adjusted in order to adjust the dampening of the vibration of the transducer. The high fluid viscosity facilitates this dampening function. The unit may be completely filled or partially filled so that the remaining space if occupied by an air bubble 33. By adjusting the size of the air bubble the dampening may be controlled to maintain the same dampening even if the gap size should vary due to manufacturing tolerances. Those familiar with transducer design will recognize that such vibration dampening promotes broadband transducer operation and suppresses undesired vibration resonances in the flexural disc structure.

In accordance with the invention, flexural discs 20 and 22 are connected to housing 12 along the transducer axis 15 by connecting studs 34 and 36. Studs 34 and 36 are rigidly connected to flexural discs 20 and 22, for example by soldering or welding, and are threaded into nuts 38 and 40 to provide and adjustable connection. Thus, by adjustment of studs 34 and 36 an outwardly bending prestressing of discs 20 and 22 can be provided to result in an initial compressive stress on ceramic discs 24 and 26.

The compressive prestressing of ceramic discs 24 and 26 is desired to adjust the zero mark to the transducer characteristic curve. It is also desirable to prestress the ceramic in a compression direction in order to render the ceramic less vulnerable to severe shock.

The ceramic transducer elements 24 and 26 are electrically connected in opposing series relation so that an acoustic disturbance incident on the transducer from the axial direction causes reinforcing voltage generation from the two transducer elements 24 and 26. In the embodiment illustrated, lead wires 42 and 44 are connected to the inner surfaces of discs 26 and 24, respectively, and to each other through the mass 14, while the outer surfaces of discs 24 and 26 are connected to the terminals 46 and 48 through the studs 34 and 36. The nuts 38 and 40 and studs 34 and 36 are sealed in by a suitable sealant 50.

Ceramic discs 24 and 26 are preferably made out of a piezoelectric ceramic material such as lead zirconate titanate. A suitable material designated G1512 is available from Gulton Industries.

An actual transducer such as that shown in FIGS. 1 and 2 may be a little more than an inch in overall diameter and approximately the same in length. The flexural brass discs 20 and 22 and ceramic discs 24 and 26 have dimensions chosen to fit within the housing 12 in the relationship shown and have thicknesses of approximately 0.010 inch. Housing 12 is typically made of molded plastic, and may be made in several pieces which are joined together upon assembly by the use of a suitable epoxy.

Those skilled in the art will recognize that the transducer illustrated in FIGS. 1 and 2 has a significant advantage in ease of construction over prior art transducers of this type. In accordance with the prior art, it was necessary to connect the center of the flexural disc elements to the inertial mass and then assemble the inertial mass within a housing which was sealed at the periphery of the flexural disc. In accordance with the present invention, assembly is facilitated by the prior assembly of all elements connected to the inertial mass and final assembly within the housing with connection of the flexural discs by the central rods to the housing at the final stage. An adjustment of the static tension on these rods is achieved after assembly. This type of assembly is not only more convenient mechanically, but it is also more convenient from an electrical standpoint, since the wires can easily be preassembled to the transducer elements as the transducer elements are assembled to the inertial mass, and then the wires can be brought through the outer plastic housing as the inner assembly is assembled within the housing.

While there has been described what is believed to be the preferred embodiment of the invention, those skilled in the art will recognize that other and further modifications may be made thereto without departing from the spirit of the invention, and is intended to claim all such embodiments as fall within the true scope of the invention.

Since reciprocity holds, this "hydrophone" described hereinabove may be used as a transmitter of acoustic waves with the same directional characteristics as in the receiving mode. This capability is further enhanced by application of compressive prestress to the ceramic discs 24, 26 allowing for higher drive signals.

I claim:

1. A directional transducer, comprising:
    a housing having an axis and defining a chamber;
    an inertial mass within said chamber;
    first and second flexural transducer elements, each comprising a planar member having a periphery, said planar members being mounted by their peripheries on axially opposite ends of said inertial mass substantially perpendicular to said axis thereby defining an air-filled space between said members and said mass;
    force transmitting means interconnecting central portions of each of said planar members with said housing along said axis;
    means for electrically connecting said transducer elements to external circuitry; and
    means for dampening vibration including the air-filled space between said members and said mass and a high viscosity fluid within said chamber, said fluid located between said housing and said members.

2. A transducer as specified in claim 1, wherein each of said planar members comprises a flexural disc.

3. A transducer as specified in claim 5, wherein said flexural disc comprises a thin metallic disc.

4. A transducer as specified in claim 5, wherein each of said transducer elements comprises a piezoelectric ceramic disc mounted on said flexural disc.

5. A transducer as specified in claim 2, wherein said force transmitting means is arranged to provide static stress on said flexural discs.

6. A transducer as specified in claim 5, wherein said ceramic discs are mounted on axially inward surfaces of said flexural discs and said force transmitting means is arranged to stress said flexural discs axially outward thereby to place said ceramic discs in compression.

7. The transducer of claim 1 wherein said force transmitting means and said means for electrically connecting include a pair of axially extending force transmitting rods, each mechanically and electrically connected to the center of one of said flexural transducer elements.

8. A directional transducer, comprising:
- a cylindrical housing having a cylindrical interior;
- an inertial mass within said housing, said inertial mass being generally cylindrical in shape and smaller than the interior of said housing, said inertial mass having a circular cavity formed in each axial end;
- a pair of planar flexural discs, one mounted to each axial end of said inertial mass covering said circular cavity;
- a pair of planar piezoelectric discs, one mounted to the axially inner surface of each of said flexural discs within said cavities;
- an air-filled space between said discs and said mass;
- a pair of axially extending force transmitting rods, one interconnecting the center of each of said flexural discs and the adjacent axial end of said housing;
- means for electrically connecting said piezoelectric discs in series opposing relation and to external circuitry; and
- means for dampening vibration including the air-filled space between said members and said mass and a high viscosity fluid within said chamber, said fluid located between said housing and said members.

9. The transducer of claim 8 wherein said means for electrically connecting includes said pair of rods.

10. A directional transducer comprising at least one flexural disc transducer element mechanically, rigidly interconnecting an inertial mass and a housing, said housing having a chamber, said flexural disc transducer element and said inertial mass in said chamber, said flexural disc being connected to said inertial mass by its periphery and to said housing by its center; and means for dampening vibration by a selected amount including an air-filled space between said element and said mass and a high viscosity fluid within said chamber, said fluid located between said disc and said housing.

* * * * *